June 19, 1923.          1,458,954.
L. ROUANET
ROLLER BEARING
Filed June 23, 1920
Fig.1    Fig.2    Fig.3
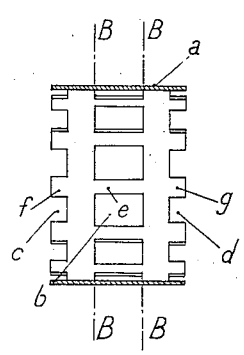 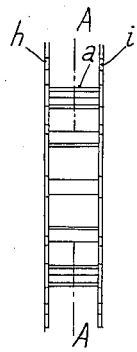 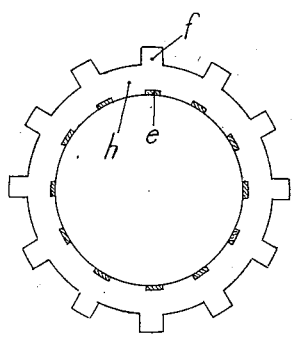
Fig.4    Fig.5
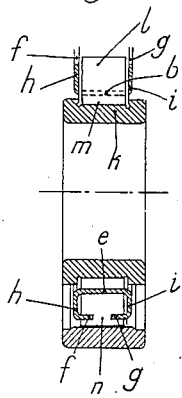 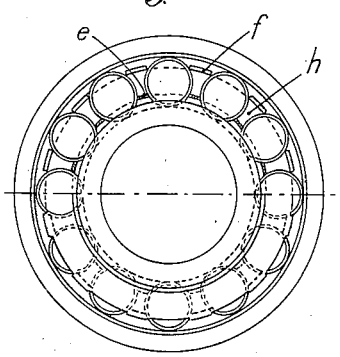
INVENTOR:
Louis Rouanet
By Wm Wallace White
ATT'Y.

Patented June 19, 1923.

1,458,954

UNITED STATES PATENT OFFICE.

LOUIS ROUANET, OF IVRY-PORT, FRANCE, ASSIGNOR TO COMPAGNIE D'APPLICATIONS MECANIQUES, OF PARIS, FRANCE.

ROLLER BEARING.

Application filed June 23, 1920. Serial No. 391,193.

(GRANTED UNDER THE PROVISIONS OF THE ACT OF MARCH 3, 1921, 41 STAT. L., 1313.)

*To all whom it may concern:*

Be it known that I, LOUIS ROUANET, citizen of the Republic of France, residing at 42 Rue Franklin, Ivry-Port, Seine, in the Republic of France, have invented new and useful Improvements in or Relating to Roller Bearings, for which I have filed applications in France, filed August 29, 1913, Patent No. 461,990; Great Britain, filed April 29, 1920; Belgium, filed August 8, 1920; and Italy, filed August 3, 1918, and of which the following is a specification.

This invention comprises improvements in or relating to roller bearings.

The chief inconvenience of the cages for roller bearings, as also for the ball bearings, is in their connecting members, such as screws or rivets and their derivatives, stays, axles, etc., these parts rendering the manufacture troublesome and the working uncertain.

The object of the present invention is to get rid of this convenience for the cages of roller bearings by making the latter of a single piece. For this purpose, as a roller bearing does not permit a cage made in one piece to be mounted without distortion, the cage in question is made of sheet metal, that is to say, of a thin laminated body of any metal, such as copper, brass, iron, steel. It is further necessary for the cage to be of such section as to offer sufficient resistance. The difficulty consists in reconciling this condition with those which every cage should fulfil in regard to its manufacture and working.

This difficulty is resolved by the cage represented in the annexed drawing, in which:—

Fig. 1 shows an axial section through the cage, before the first folding operation.

Fig. 2 is a side view of the cage after the first folding operation.

Fig. 3 is a section of the cage A—A of Fig. 2.

Fig. 4 is an axial section of a roller bearing with, in the upper half, the cage shown before the last folding operation, the outer ring being removed, and in its lower half the cage finished.

Fig. 5 is a front view of a roller bearing with the cage, half being shown in section.

The construction and mounting of the cage are effected in the following manner:— In a tube $a$, preferably of brass or copper of the desired length, Fig. 1, are cut three recesses $b$, $c$, $d$ situated on the same generating line, which can be done with one blow of a punch. This is continued over the whole circumference, the three recesses being cut as many times as there are rollers. This operation ended, the recesses or notches $c$ and $d$ will leave between them fingers $f$ and $g$, and the recesses or openings $b$ leave bridges $e$. Then the ends of the tube are bent over at the height of the side edges of the openings b, which height is marked by the lines B—B in Fig. 1; these bent over ends form side walls $h$, $i$ perpendicular to the tube $a$ (Fig. 2).

Alternatively, only the openings $b$ can be cut in the tube $a$; then the ends of the tube are bent at the height of the line B—B (Fig. 1) until the position at right angles of the walls $h$, $i$ and then the notches $c$, $d$ are cut out. Or this latter variation of construction is further modified by inverting the order of cutting out the recesses $b$ and $c$ $d$.

Preference will be given to either method, according to the tools at disposal.

The cage having the form indicated in Fig. 2 is ready to be mounted. For this purpose it is placed on the inner ring $k$ of the bearing (Fig. 4) and the rollers $l$ are inserted in the groove $m$ of the latter by placing them in the openings $b$. In order to finish the mounting, the fingers $f$ and $g$ are bent in a plane perpendicular to the walls $h$ and $i$, that is to say, parallel with the bridges $e$ so that the cage has a rectangular section formed by the walls $h$ and $i$, on the one hand, and the bridge $e$ together with the fingers $f$ and $g$, on the other hand. This section affords in the given circumstances the maximum resistance, whilst still maintaining the rollers in all directions.

The length of the fingers $f$ and $g$ is so determined as to leave between them, when completely folded, a more or less wide circumferential opening $n$ (Fig. 4) in order to allow of the filling and cleaning of the oil reservoirs formed by the walls $h$ and $i$ between the rollers.

The cage is of great strength and allows of easy lubrication; it is also light in weight and gives the minimum friction.

Having now described my invention, what I claim as new and desire to secure by Letters Patent is:

A cage for cylindrical roller bearings comprising an annular sheet piece provided in its cylindrical part with rectangular openings through which the rollers are adapted to extend and on both rims with rectangular notches in line with the said openings, the sheet of metal of said annular piece being folded at right angles towards the exterior along the lines marking the side edges of said openings and along the lines marking the inner sides of said notches, in such manner that the longitudinal strip left between said openings and said notches form walls covering the transverse sides of the rollers.

In testimony whereof I have signed my name to this specification in the presence of a subscribing witness.

LOUIS ROUANET.

Witness:
    CLEMENT S. EDWARDS.